United States Patent [19]

Didrickson

[11] 4,076,150
[45] Feb. 28, 1978

[54] ROTARY AIRLOCK HAVING ADJUSTABLE BLADES TO MAINTAIN A SEAL

[76] Inventor: Donald D. Didrickson, 3648 Quince Court, Downers Grove, Ill. 60515

[21] Appl. No.: 686,389

[22] Filed: May 14, 1976

[51] Int. Cl.² .............................................. G01F 11/10
[52] U.S. Cl. ...................................... 222/368; 302/49
[58] Field of Search ........................ 222/194, 368, 306; 302/48, 49; 403/388, 393, 401

[56] References Cited

U.S. PATENT DOCUMENTS

| 2,083,354 | 6/1937 | Whittier | 403/401 X |
|---|---|---|---|
| 3,201,007 | 8/1965 | Transeau | 222/368 X |
| 3,708,890 | 1/1973 | Weisselberg | 222/368 X |
| 3,830,581 | 8/1974 | Furlong | 403/388 X |

Primary Examiner—Drayton E. Hoffman
Assistant Examiner—Fred A. Silverberg
Attorney, Agent, or Firm—Dressler, Goldsmith, Clement, Gordon & Shore, Ltd.

[57] ABSTRACT

A rotary airlock for conveying material has a housing which includes a cylindrical wall and a pair of generally flat end walls which together define a cylindrical chamber. A plurality of vanes are secured to a shaft which extends axially through the housing. A plurality of blades are fixedly secured to each vane and are movable in all directions in the plane of the vane to enable the clearance between the blades and cylindrical wall and the end walls of the housing to be adjusted to maintain a seal between the blades and the housing and to minimize the leakage of air and material from the airlock.

6 Claims, 5 Drawing Figures

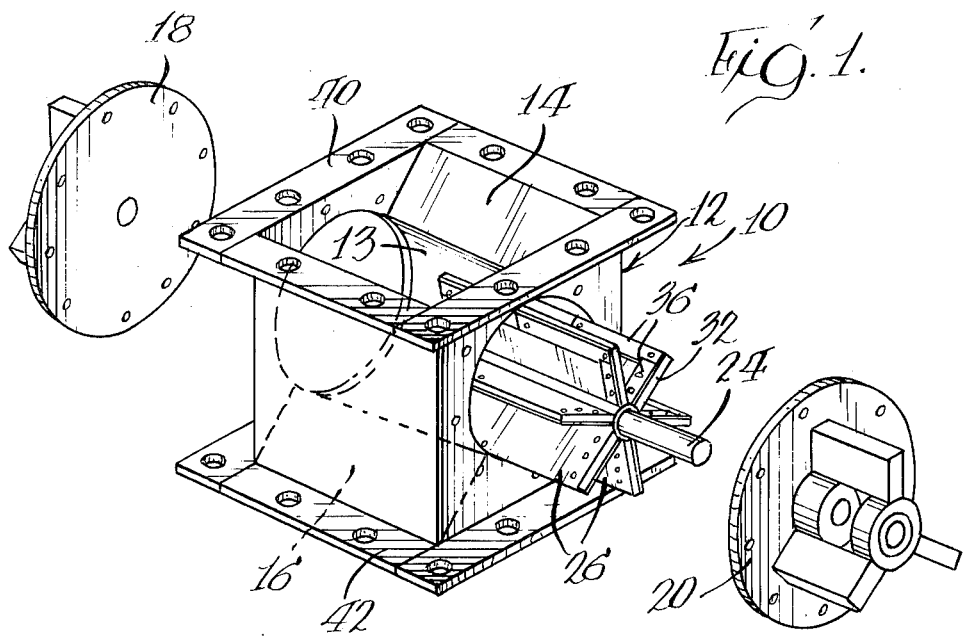
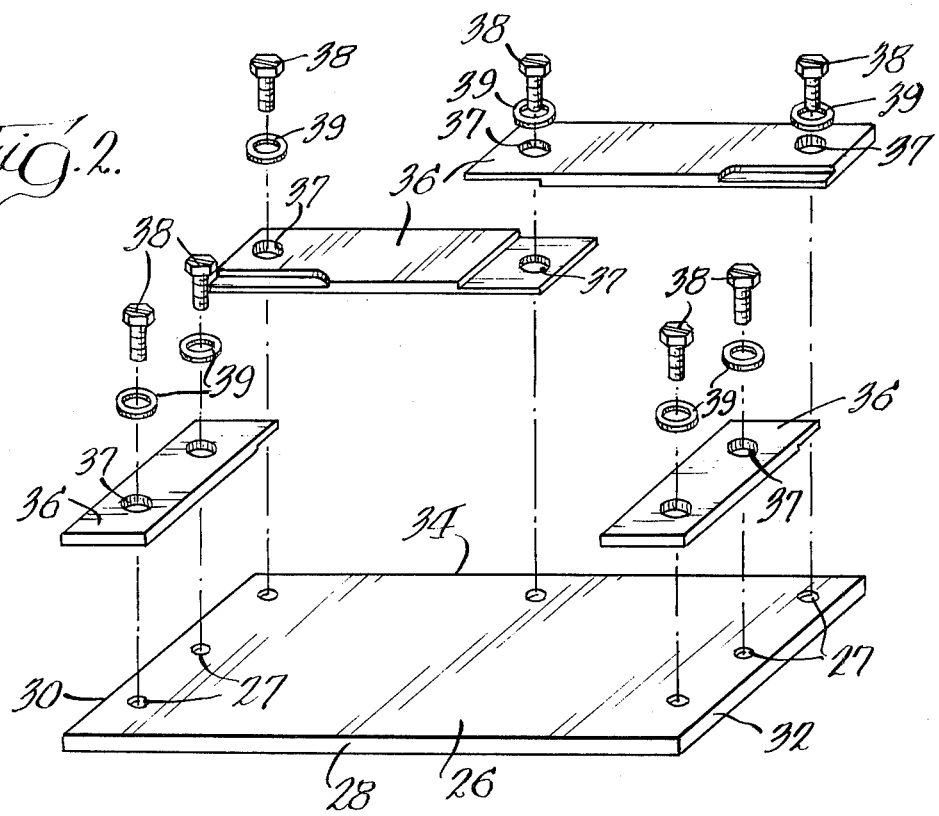

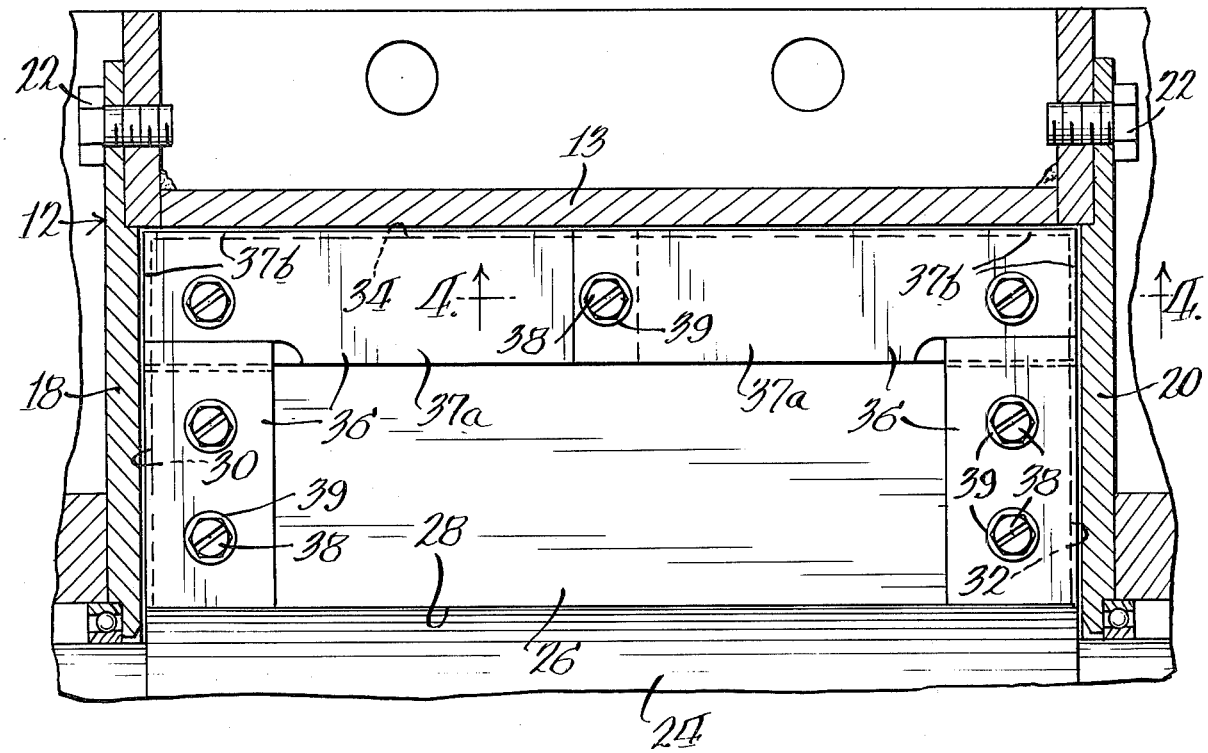
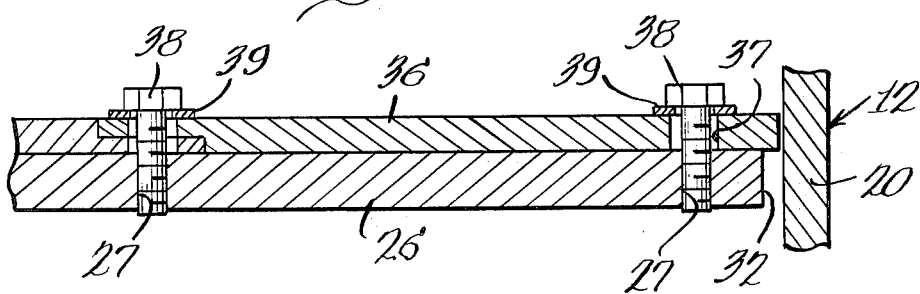
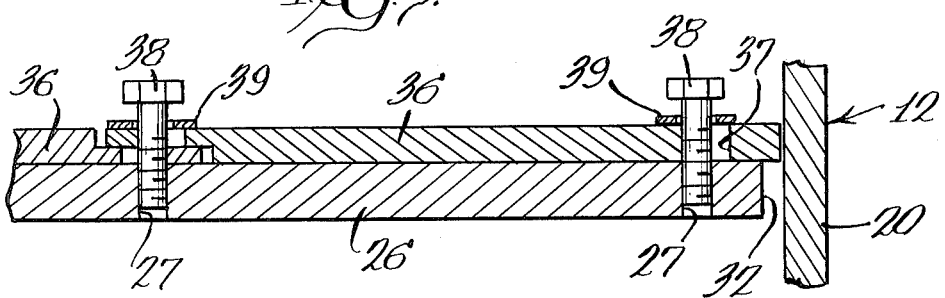

ROTARY AIRLOCK HAVING ADJUSTABLE BLADES TO MAINTAIN A SEAL

BACKGROUND OF THE INVENTION

This invention pertains to rotary airlocks. More specifically, the present invention relates to rotary airlocks that are used for feeding a metered amount of material under pressure or vacuum while sealing in air and the material.

Conventional airlocks include a cylindrical housing, a shaft extending therethrough, and a plurality of vanes which are secured to the shaft. The vanes have three working edges which desirably have a minimum clearance relative to the housing, or a blade may be secured to the vane and extend outwardly therefrom to provide a minimum clearance relative to the housing. An inlet and outlet communicate with a chamber defined by the housing.

The airlocks are frequently used to feed a metered amount of material from a top bin into the airlock inlet and out of the airlock outlet to a bottom bin or discharge line. Since airlocks are normally used with a pressure or partial vacuum in the discharge line, it is important to maintain the smallest possible clearance between the vanes (or blades) and the housing to minimize the leakage of air and material to thereby maximize the efficiency of the airlock.

There is always some air leakage. Some clearance must be provided between the vanes and the housing to allow for rotation of the shaft and vanes. In addition, as the airlock is used, the amount of leadage of air and material increases due to wear of the housing and the working edges of the vanes or blades which increases the size of the gap therebetween. Furthermore, the pockets which are defined between the shaft, housing and adjacent vanes, cause some leakage when they return to the airlock inlet.

In an attempt to solve the problem of wear, some prior art devices disclose blades that can be replaced in their entirety as wear occurs. The disadvantages of this arrangement are the cost of the new blades and the cost of the down time when the airlock is removed from service to effect repair.

Other prior art devices disclose tips which are secured to the vanes and are adjustable radially relative to the shaft. Inasmuch as only a single tip is attached to each vane and the tip is movable only radially, no adjustment can be made to compensate for the wear of the tips along the ends of the housing.

Consquently, the prior art devices fail to solve the problem of minimizing the clearance between the vanes (or blades) and the housing to reduce leakage of air and material after wear occurs during use of the airlock.

SUMMARY OF THE INVENTION

In this invention, the foregoing problems are solved by providing a rotary airlock having a housing which includes a cylindrical wall and a pair of generally flat end walls which define a cylindrical chamber. A plurality of rotating vanes are positioned in the chamber, with each vane having a plurality of blades fixedly secured thereto and extending outwardly therefrom. The blades each have a working edge adapted to be positioned at a predetermined minimum clearance relative to the housing. The blades on each vane are movable in the plane of the vane to which they are attached for adjusting the clearance between the blades and the cylindrical wall and end walls of the housing to maintain a seal between the blades and the housing to minimize the escape of air and material from the airlock. The term "seal" is used herein to describe the relationship between the blades and the housing even though it is recognized that there is some clearance therebetween to permit rotational movement.

More specifically, the housing defines a generally cylindrically shaped chamber, and a rotatable shaft that extends axially through the chamber. A plurality of vanes have one edge secured to the shaft, and the remaining edges of the vanes terminate adjacent to and spaced from the housing. Each vane is provided with a plurality of apertures of a first diameter adjacent to the remaining edges of the vane.

A plurality of blades are juxtaposed to the remaining edges of the vanes and extend outwardly toward the housing. Each blade has a plurality of apertures of a second diameter in communication with the apertures in the vanes.

Fastening means such as screws extend through the apertures in the vanes and the blades. The apertures in the blades or the vanes, or both, have a diameter greater than the diameter of the screws which extend therethrough, to enable the screws to be movable between a first tightened position in which the blades are fixedly secured to the vanes, and a second loosened position in which the blades are movable relative to the vanes and the housing in the plane of each vane to adjust the clearance between the blades and the housing.

It is a feature of the present invention that the initial clearance between the blades and the housing can be set at the preferred clearance most suited for the material to be handled, without having to dismantle the airlock from the system in which it is used. Concomitantly, the clearance between the blades and the housing can be reset to the initial tolerances without dismantling, replacing, or otherwise inserting new blades. If desired, the blades can be replaced without dismantling the airlock from the rest of the system.

The use of these blades eliminates the need to machine the housing to virtually exact dimensions. It is sufficient for the interior surfaces of the housing to be smooth for the proper mating of the blades with the housing. Thus the housing and vanes do not have to be replaced or re-machined as frequently. In addition, the adjustable feature of the blades enables the housing, vanes and blades to be re-machined to new tolerances, whereupon the blades can be readjusted to the proper clearances.

BRIEF DESCRIPTION OF THE DRAWINGS

FIG. 1 is an exploded perspective view of the rotary airlock of the present invention;

FIG. 2 is an exploded perspective view of the blades, vanes, and fastening means of the rotary airlock shown in FIG. 1;

FIG. 3 is a front elevational view of the vanes in the rotary airlock shown in FIG. 1;

FIG. 4 is a cross-sectional view taken along plane 4—4 in FIG. 3; and

FIG. 5 is a cross-sectional view similar to FIG. 4 and showing a pair of blades on one of the vanes after adjustment of the blades.

DESCRIPTION OF THE PREFERRED EMBODIMENT

Rotary airlock 10, illustrated in FIG. 1, is used to feed materials under pressure or vacuum while sealing in gas and air. The airlock includes a housing 12 having a cylindrical wall 13 which defines a generally cylindrically shaped chamber. An inlet opening 14 and outlet opening 16 are provided in the wall 13 of the housing and communicate with the chamber. A pair of end plates 18 and 20, each having a generally flat inner surface, are secured to the housing by means of screws 22 (FIG. 3).

A rotatable shaft 24 extends axially through the chamber in the housing and is driven by any suitable motor means (not shown). A plurality of vanes 26, such as the six vanes illustrated in FIG. 1, are each sealingly secured along edge 28 to shaft 24, as by welding. Preferably, the vanes are equally spaced, planar, and extend radially outwardly from shaft 24. As shown in FIG. 3, the remaining side edges 30 and 32 and longitudinal edge 34 of each vane 26 terminate adjacent to and are spaced from the housing 12, with longitudinal edge 34 being adjacent to the cylindrical wall 13 of the housing 12, and side edges 30 and 32 terminating adjacent to end plates 18 and 20, respectively.

Since the airlock is commonly used to feed materials under pressure, vacuum, or both, it is essential to form an effective seal between the vanes and the housing to minimize the escape of air and material. Consequently, in accordance with the present invention, a plurality of blades 36 are provided along the side edges 30 and 32 and the longitudinal edge 34 of each vane 26. As shown in FIG. 3, the blades include a first portion 37a which is juxtaposed to one of the side or longitudinal edges 30, 32, 34 of a vane 26, and a second portion 37b which extends outwardly from one of the side or longitudinal edges 30, 32, 34 of the vanes toward the housing 12. A minimum clearance is provided between the blades 36 and the cylindrical wall 13 and end plates 18 and 20 of the housing to allow rotation of the vanes and blades about the shaft 24, while maintaining an effective seal between the blades and the housing.

To connect the blades 36 to the vanes 26, fastening means such as a plurality of screws 38 are provided and extend through apertures in the vanes 26 and blades 36, and washers 39 are provided between the head of the screw and the blade to distribute the forces thereto. Thus, each vane 26 is provided with a plurality of apertures 27 of a first diameter adjacent to edges 30, 32 and 34, and each blade 36 is provided with a plurality of apertures 37 of a second diameter in alignment with the apertures in the vanes.

The diameter of the apertures in the blades or vanes, or both, is greater than the diameter of the screws. The blades 36 on each vane 26 can thereby be moved relative to the housing 12 in all directions in the plane of each vane 26 to adjust the clearance between the blades 36 and the housing 12. The blades 36 can be moved a distance corresponding to the difference in diameter between the screws 38 and the plurality of apertures having the greater diameter.

For example, the apertures 37 in the blades 36 can have a greater diameter than the apertures 27 in the vanes 26, as shown in FIGS. 2, 4 and 5. The ends of the screws 38 engage the vanes 26 along the outer walls of the apertures 27. The screws 38 are thereby in an initially tightened condition in which the blades 36 are fixedly secured to the vanes 26 (FIG. 4), can be loosened to a position in which the blades are movable for the purpose of maintaining an effective seal between the blades and the housing (FIG. 5), and thereafter can be re-tightened to fixedly secure the blades to the vanes in the adjusted position.

According to a further feature of this invention, the screws 38 are removable from the vanes 26 (FIG. 2) to enable the blades 36 to be replaced, as when the blades become worn.

To enable adjustments in the position of the blades 36 in all directions in the plane of each vane, at least three and preferably four blades 36 are provided, with at least one separate blade 36 being juxtaposed to each side edge 30 and 32 and longitudinal edge 34 of each vane 26. Preferably, a portion of each blade adjacent to at least one end thereof has a reduced thickness, and is adapted to mate with a reduced-thickness portion of each adjacent blade on each vane. The reduced-thickness portions of the adjacent blades are juxtaposed to one another and overlap so that the blades 36 are substantially continuous along edges 30, 32 and 34 of each vane 26 both before and after the clearance between the blades 36 and the housing 12 is adjusted.

Since the blades 36 are movable relative to the cylindrical wall 13 and end plates 18 and 20 in the plane of the vane 26 to which the blades are fixed, wear of the housing 12 and vanes 26 can be compensated for by adjusting the position of the blades to maintain an effective seal between the blades and the housing. Consequently, it is a further advantage of the present invention that worn housings and vanes require less frequent replacement than when a conventional airlock is used.

In use, the airlock 10 of the present invention can be bolted to a top bin (not shown) along the housing top wall 40 which defines the inlet opening 14. The inlet opening 14 communicates with the bin, and a seal may be formed between the airlock and the bin to prevent the escape of material. The material exits the airlock through outlet opening 16 and travels through a discharge line (not shown) which is bolted to the housing bottom wall 42 which defines the outlet opening 16. The discharge line communicates with the outlet opening 16, and a seal may be formed between the discharge line and the airlock to prevent the escape of air and material.

In a typical application, a positive pressure is maintained in the discharge line by employing a pump which forces air into the discharge line. The seal between the discharge line and the airlock prevents air leakage, and the minimal clearance between the blades 36 and the housing 12 minimizes the amount of air that leaks from the pressurized discharge line. When the blades become worn, the clearance between the blades and the housing can be adjusted without removing the airlock from the line by simply loosening the screws 38, moving blades 36 into the desired position, and re-tightening the screws 38 to fixedly secure the blades 36 to the vanes 26. If desired, one or more of the blades can be replaced without removing the airlock from the line by removing the screws 38, removing the old blades and positioning new blades in their place, and then re-tightening the screws to fixedly secure the new blades to the vanes. It has been found that airlocks formed in accordance with the principles of the present invention can withstand pressure differentials up to at least 50 pounds per square inch.

The housing 12, shaft 24, vanes 26 and blades 36 may be formed of steel, and the screws 22 and 38 may comprise bolts formed of stainless steel and which are chrome plated to resist corrosion.

While this invention is susceptible of embodiment in many different forms, there is shown in the drawings and has been described herein in detail a specific embodiment of the invention, with the understanding that the present disclosure is to be considered as an exemplification of the principles of the invention and is not intended to limit the invention to the embodiment illustrated.

What is claimed is:

1. A rotary airlock for conveying material having a housing which includes a cylindrical wall and a pair of end walls which together define a generally cylindrically shaped chamber and a plurality of rotating members in said chamber which extend toward said housing and are spaced therefrom to permit rotation while maintaining a seal with said housing, said airlock comprising:

a rotatable shaft extending axially through said chamber;

said plurality of rotating members comprising a plurality of vanes having one edge secured to said shaft, the remaining edges of said vanes terminating adjacent to and spaced from said cylindrical wall and said end walls respectively, each of said vanes being provided with a plurality of apertures adjacent to said remaining edges of said vane; a plurality of blades secured to said remaining edges of each of said vanes and extending toward said housing, with at least one blade on each edge adjacent the respective end walls and at least two blades in end-to-end relation on the edge adjacent said cylindrical wall, the adjacent edges of all of said blades having overlapping portions to define a continuous edge along said cylindrical wall and said end walls, each blade being provided with a plurality of apertures in alignment with said apertures in said vanes; and fastening means which extend through said pluralities of apertures to secure said blades to said vanes, one of said pluralities of apertures having a first diameter greater than the diameter of the other of said pluralities of apertures to enable each of said blades on each vane to be moved relative to said vanes and said housing in all directions in the plane of said vane to adjust the clearance between said blades and said housing while maintaining said continuous edge to maintain a seal therebetween and minimize leakage from said airlock.

2. The rotary airlock as defined in claim 1 wherein wherein said fastening means are movable between a first position in which said blades are fixedly secured to said vanes and a second position in which said blades are movable relative to said vanes.

3. The rotary airlock as defined in claim 2 wherein said apertures in said blades have a greater diameter than said apertures in said vanes.

4. The rotary airlock as defined in claim 3 wherein said fastening means comprises a plurality of screws which are receivable in said apertures in said vanes to fixedly secure said blades to said vanes.

5. The rotary airlock as defined in claim 2 wherein said fastening means are removable from said vanes and said blades to enable said blades to be replaced.

6. The rotary airlock as defined in claim 2 wherein said blades each comprise a first portion juxtaposed to one of said vanes and a second portion which extends from at least one of the remaining edges of said vane toward said housing, said blade being movable relative to said vane and said housing by an amount corresponding to the difference in diameter between said fastening means and said plurality of apertures having the greater diameter.

* * * * *